UNITED STATES PATENT OFFICE.

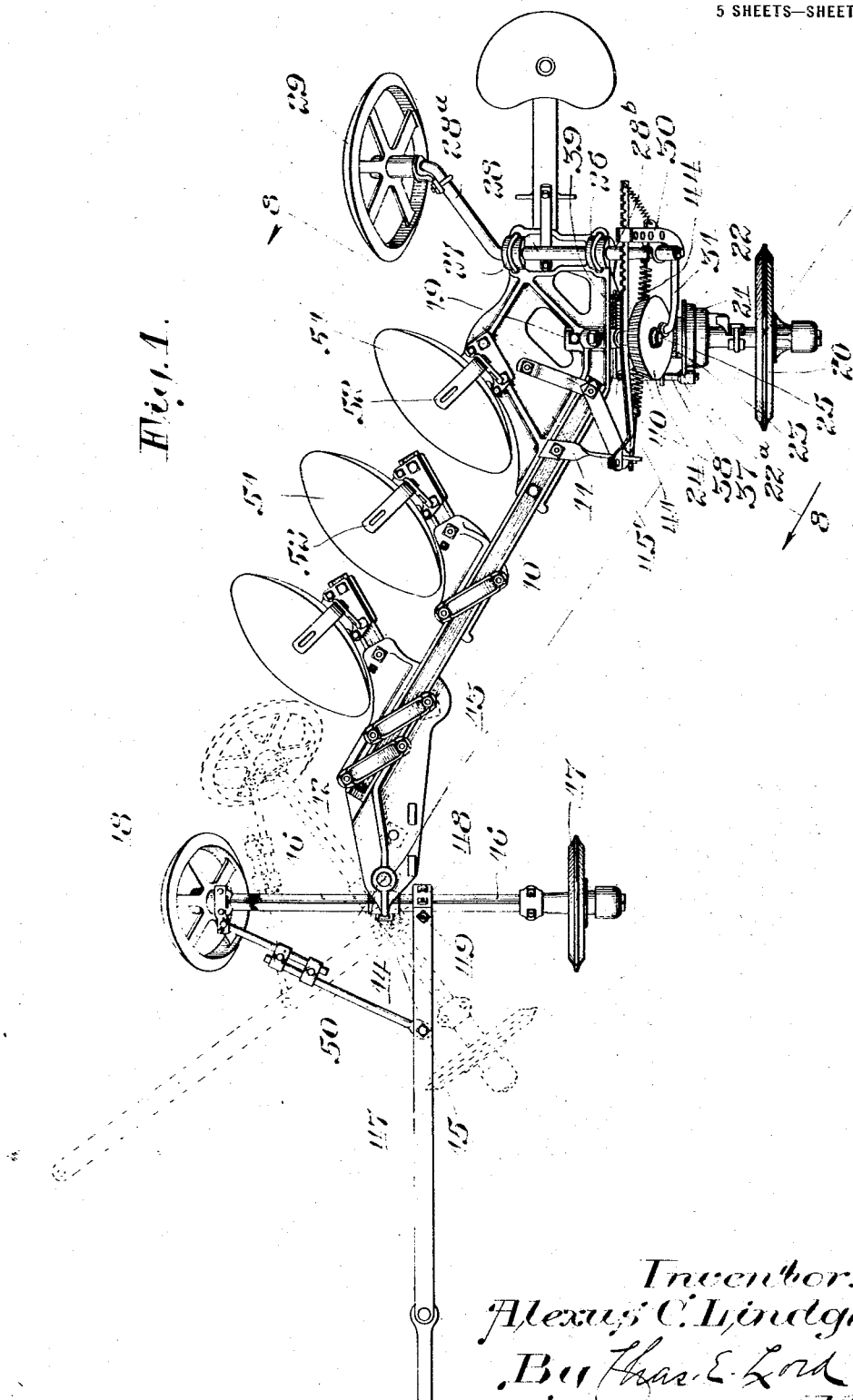

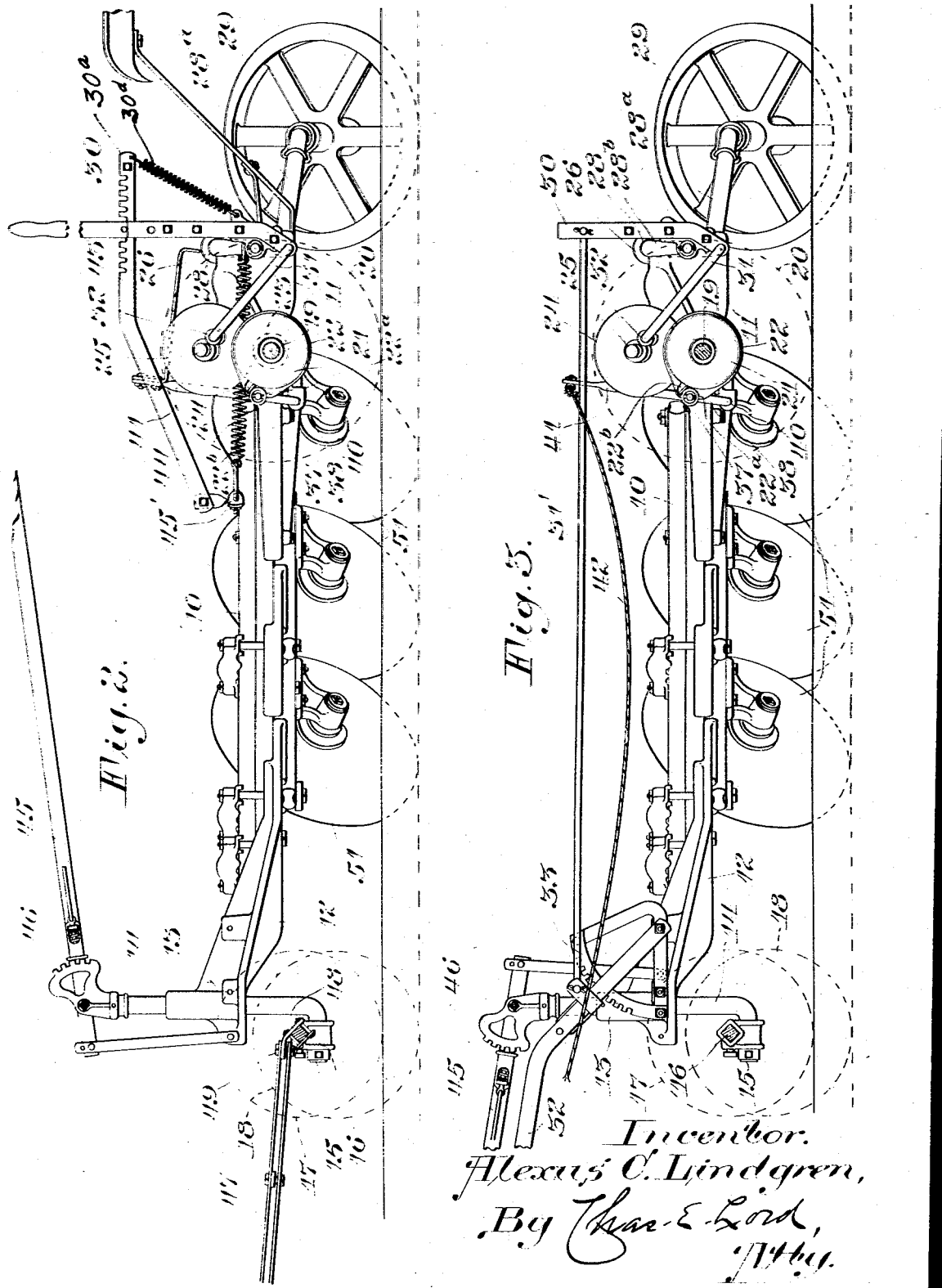

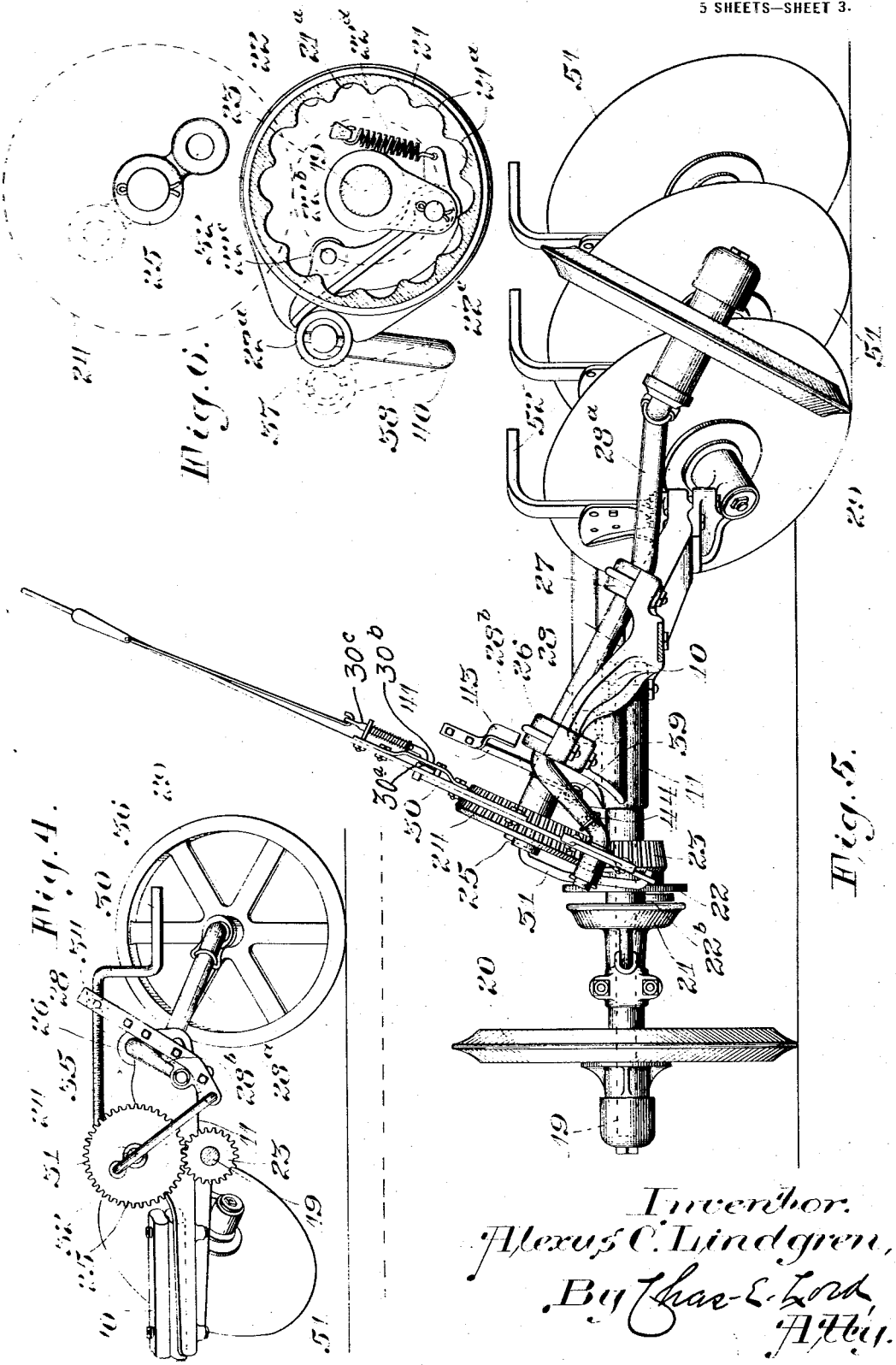

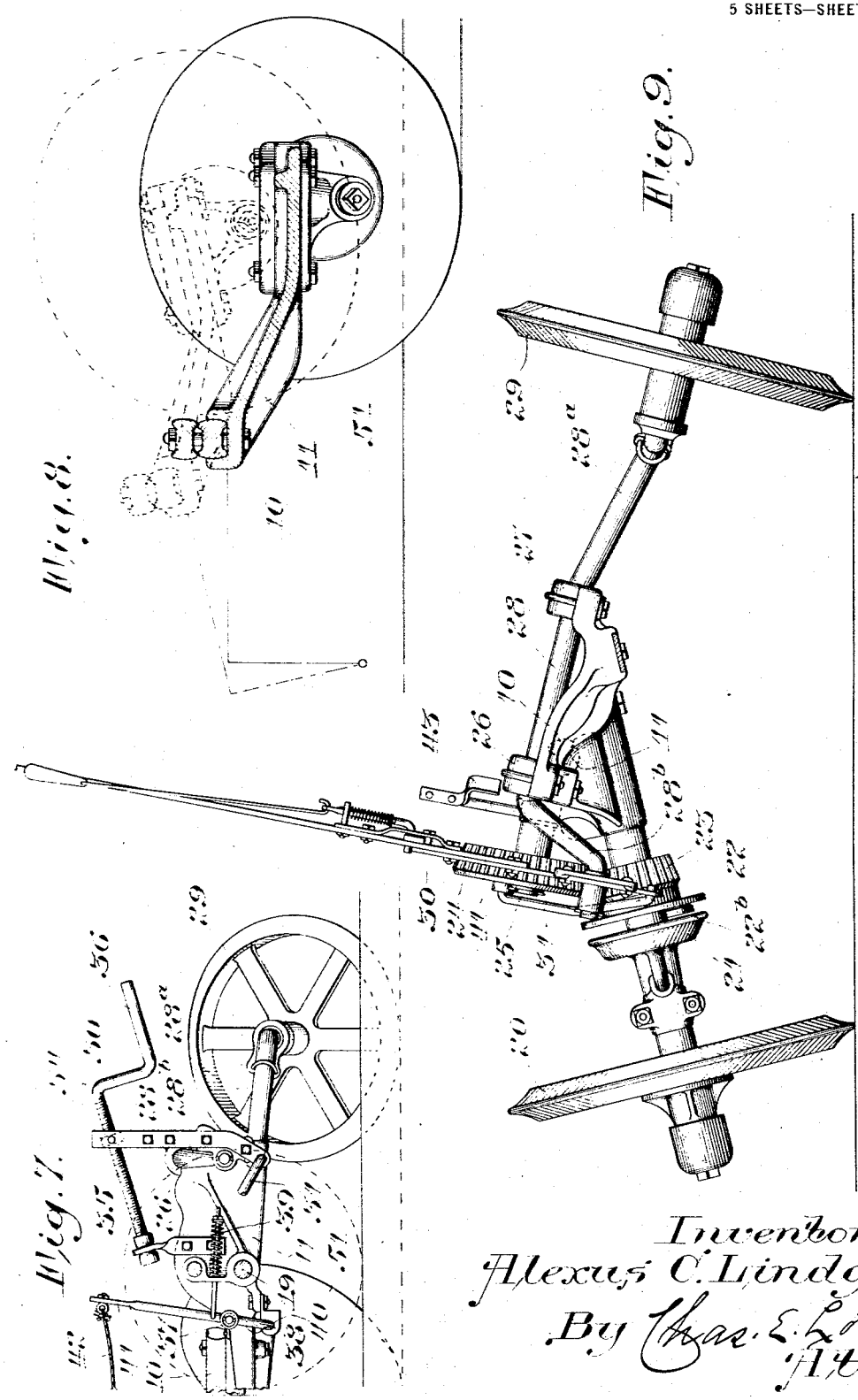

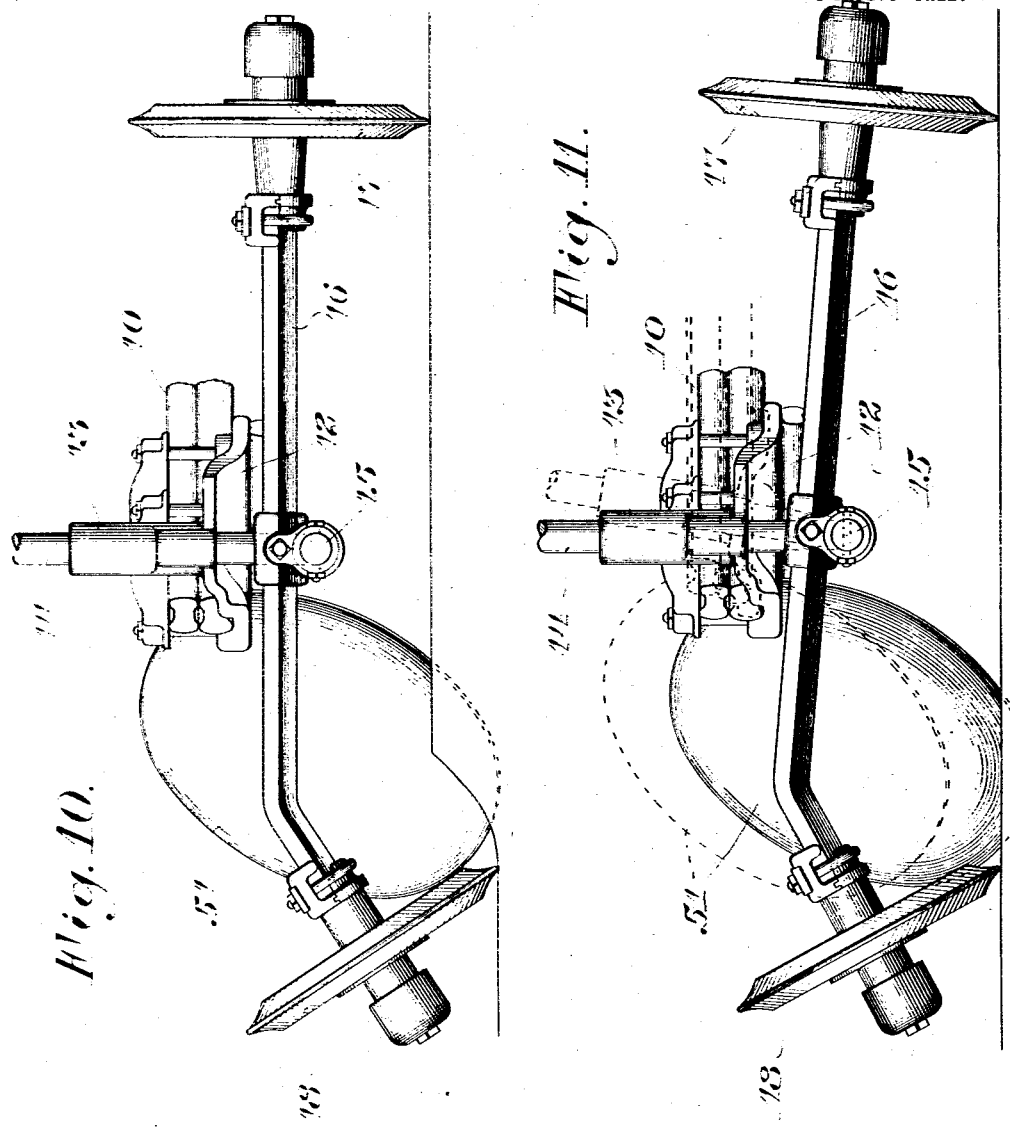

ALEXUS C. LINDGREN, OF HAMILTON, ONTARIO, CANADA, ASSIGNOR, BY MESNE ASSIGNMENTS, TO FRED GERLACH AND ARNOLD B. KELLER, TRUSTEES, BOTH OF CHICAGO, ILLINOIS.

POWER-LIFT DISK PLOW.

1,387,500. Specification of Letters Patent. Patented Aug. 16, 1921.

Application filed October 28, 1918. Serial No. 259,959.

*To all whom it may concern:*

Be it known that I, ALEXUS C. LINDGREN, a citizen of the United States, residing at Hamilton, in the county of Wentworth and Province of Ontario, Dominion of Canada, have invented certain new and useful Improvements in Power-Lift Disk Plows, of which the following is a full, clear, and exact specification.

This invention relates to plows and especially to power lift plows.

An object of the invention is to provide a power lift plow which takes its power from a wheel so located as to give the best and most rigid drive with the least possible mechanism. Heretofore the drive wheel or power lift plows has moved relative to the frame and the connecting mechanism was necessarily complicated and insecure. This objectionable feature has been entirely overcome as will be hereinafter explained.

Another object of the invention is to provide a plow with lifting mechanism so arranged as to throw as little strain as possible on said mechanism in performing the lifting operation.

Another object is to provide a power lift plow which permits of sharp turns, which allows the tractor hitched thereto to run entirely on the unplowed ground, and which is equally well adapted to be drawn by a tractor or by horses.

Another object is to provide a power lift plow which is simple, inexpensive to manufacture, easy to adjust for different widths of cut, and which is easy to operate.

With these and other objects in view my invention consists in the arrangement and combination of parts as shown and described and as covered by the appended claims.

I will now refer to the drawings in which Figure 1 is a plan view of my invention;

Fig. 2 is a side elevation with the rear land wheel removed, having a seat at the rear and a depth regulating lever operable from the seat;

Fig. 3 is the same without a seat and having a depth regulating lever operable from a tractor;

Fig. 4 is the same but showing only the rear end and having a screw depth regulating means;

Fig. 5 is a rear elevation when plowing;

Fig. 6 is a partial section showing the clutch mechanism;

Fig. 7 is the same as Fig. 4 but in plowing position and with the gears removed;

Fig. 8 is a partial section on the line 8—8 of Fig. 1 showing the rocking action of the disks in raising or lowering;

Fig. 9 is the same as Fig. 5 but showing the plow entirely out of the ground;

Fig. 10 is a front elevation showing the front support in plowing position; and

Fig. 11 is the same as Fig. 10 but as it appears when the furrow wheel has run out of the furrow.

The embodiment of my invention as shown consists of a frame made up of a diagonal member 10 to the rear end of which is bolted the casting 11 and the casting 12 is clamped to the forward end. The forward casting 12 has a vertically disposed boss 13 through which a spindle 14 is journaled. The lower end of this spindle is bent at right angles and forms a horizontal journal 15 on which is swingably mounted a transport axle 16. This axle carries land and furrow wheels 17 and 18 respectively.

It will, therefore, be seen that the transport axle is flexibly mounted and is able to turn with respect to the frame about both vertical and horizontal axes and that a rocking support for spindle 14 is provided.

The rear casting 11 has rigidly mounted thereon a stub axle 19 which I have preferably placed at such an angle as to cause it to lie approximately horizontal when the plow disks are in the ground. This stub axle carries a land wheel 20 to the inner hub of which is secured one member 21 of a clutch. The other member 22 of the clutch carries an integral bevel pinion 23 and both are journaled on the stub axlt 19. This pinion 23 meshes with a bevel gear 24 which is mounted on an inclined stub shaft 25, which is secured to the rear casting 11.

The rear casting 11 also has two bearings 26 and 27 in which is rotatably journaled the crank axle 28 in a line approximately parallel to the stub shaft 25 and at an upwardly directed angle with axle 19. This crank axle has a crank 28$^a$ and carries a furrow wheel 29 at its outer end and a crank 28$^b$ at the inner end, preferably at right angles to the crank 28$^a$. On this crank is hingedly mounted an adjusting lever 30 preferably at a point between its two ends. A connecting link 31 has two bent ends one of which passes through the lower end of the lever 30 while the other passes through the hole 32 in the bevel gear 24, which thereby serves as a crank to operate the crank axle 28, as will be hereinafter explained.

The depth to which the plow bodies will enter the ground is regulated by the adjusting lever 30 and depends upon the swing of the upper end of this lever. Three methods are shown for doing this; Fig. 2 shows a form in which the lever 30 is extended to form a hand lever and a pivoted rack-bar 30$^a$ extends through a stirrup 30$^b$ (Fig. 5) on the lever and is adjustably locked to the lever by a spring pressed detent 30$^c$. A coil spring 30$^d$ yieldingly retains the rack-bar against its rest in the stirrup. It will be noted that a seat is placed convenient to the lever as this form is intended for use either as a horse drawn plow or for use behind a tractor. Fig. 3 shows a rod 31' running from the uper end of this lever 30 to the forward end of the plow frame where it is connected to a lever 32 and quadrant 33 and placed within easy reach of the operator when the plow is drawn by a tractor. Fig. 4 shows still a different form having the lever 30 adjusted by means of a nut 34 carried thereby and a screw 35 having an integral crank 36.

The clutch member 22 has a notch 22$^a$ into which falls the roller 37 carried by the arm 38 and pressed thereto by the spring 39. This arm is carried by a shaft 40 hingedly mounted on the frame and having a lever 41 which may be operated by a rope 42 as in Fig. 7, or by the foot pedal 43 as in Fig. 2. The normally stationary clutch element 22 has pivotally mounted thereon at 22$^e$ a finger 22$^b$ carrying a roller 22$^c$ which is adapted to engage notches 21$^a$ in the movable clutch member 21, when the finger 22$^b$ is released by withdrawal of the roller 37 from the notch 22$^a$. The roller 22$^c$ is urged into the notches 21$^a$ by the spring 22$^d$.

A counterbalancing spring 44 is placed between the crank 28$^b$ and the bracket 45' carried by the main frame.

Other forms of plow bodies may be used by slight changes in the construction but I prefer to illustrate my invention in connection with disks. These are mounted on the frame in the usual way.

Adjustment of the height of the forward end is obtained by means of the lever 45 and the quadrant 46 acting on the spindle 14. This is particularly necessary in opening a furrow.

The hitch consists of a draw bar 47 which is hingedly attached to the transport axle 16 by means of a strap 48 and a bolt 49. An adjustable link 50 maintains the proper angle of the forward wheels with respect to the line of travel.

The disks 51 are attached to the frame in any suitable manner. Scraper supports 52 are shown, but with the scrapers removed.

In operation the plow base is lowered into the ground by a pull on the rope 42 from the tractor seat or by a push on the foot pedal 43 from the operator's seat on the plow, which causes the clutch 21 to operate the crank 28$^a$. Another actuation of this lever causes the frame to rise, the motion in both cases taking place about a line through the point of contact of the power wheel with the ground and the horizontal journal 15 on the spindle 14, this line being substantially parallel to the line of plow bodies so that they are all raised an equal amount, the angular position of the crank axle 28 with respect to the frame and the axle 19 resulting in a material increase in the elevation obtainable with a comparatively short crank when the lift is operating, thus assuring clearance for the plows when in inoperative position; and moreover when the frame is lowered and the plow working, the wheel 29 is given the necessary tilt for proper engagement with the furrow side as the axes of the axle and of the spindle on the crank are practically parallel. As a further result of the angular position of the axle 28, the tread of the furrow wheel is kept substantially parallel to that of the land wheel 20 in all positions of adjustment. It will therefore be seen that the frame is supported at three points, namely, the rear land wheel 20, the rear furrow wheel 29, and the horizontal journal 15, and that the lifting is done by means of the furrow wheel 29 which is so placed as to have the weight of the plow between itself and the axis about which the frame is moved.

The weight being distributed between three points of support, the force required to raise the weight on one of these supports will necessarily be much less than that required to raise the entire plow frame bodily, as is now done in other forms of power lift plows.

It will also be noticed that the power drive is taken off the land wheel which is mounted on an axle rigid with the frame. The gearing is consequently more simple than would be the case where the drive is taken off a power wheel which swings with respect to the frame.

The gear reduction of one to two between the bevel gears 23 and 24 permits the clutch to make one complete revolution on raising the plow and another revolution for lowering, while gear 24 makes a half revolution and becomes locked when the link 34 is at the extreme ends of its throw in each direction. In this way a simpler clutch is permissible than in the case of a power wheel raising on one half revolution and lowering on the other as the clutch requires but one locking point, while the strain placed upon the power wheel in order to raise the plow is only one half as great.

It will also be noticed that the hitch is placed on the frame at a point well inside the forward furrow wheel so that a tractor drawing it will run with both wheels on the unplowed land at all times.

While I have described this principally as a tractor plow it is to be understood that it is equally well adapted to be used as a horse drawn plow. When so used the seat and the foot pedal 43 are added as shown in Fig. 1.

While I have shown and described but a few forms of my invention, it is to be understood that it is capable of other modifications. Changes, therefore, in the construction and arrangement may be made without departing from the spirit and scope of my invention as disclosed in the appended claims.

I claim as my invention—

1. In a power-lift plow, a front axle, a beam having a laterally offset portion which is swiveled to the axle, a plow carried on the opposite side of the beam, wheeled axles extending oppositely from the rear of the beam, the one on the plow side being vertically adjustable, and means for moving the plow to and from working position by adjusting said axle to rock the beam around a longitudinal axis passing through said swivel and the other wheel.

2. In a power-lift plow, a front axle, a beam having a laterally offset portion, a standard adjustably connected to said portion and swiveled to the axle, a plow carried on the opposite side of the beam, wheeled axles extending oppositely from the rear of the beam, the one on the plow side being vertically adjustable, and means for moving the plow to and from working position by adjusting said axle to rock the beam around a longitudinal axis passing through said swivel and the other wheel.

3. In a power lift plow, a frame transport means at its forward end to which the frame is rockably connected, an axle on the rear end of said frame, a ground wheel revolubly mounted on said axle, and means for raising and lowering said frame by rocking it about a line drawn through the point of contact of said ground wheel with the ground and said rockable connection.

4. In a power lift plow, a frame, transport means at its forward end to which the frame is rockably connected, an axle on the rear end of said frame, a ground wheel revolubly mounted on said axle, and means for raising and lowering said frame by rocking it about a line drawn through the point of contact of said ground wheel with the ground and said rockable connection, said means including an adjustable furrow wheel opposite said ground wheel.

5. In a power lift plow, a frame, transport means at its forward end to which the frame is rockably connected, an axle on the rear end of said frame, a ground wheel revolubly mounted on said axle, and means for raising and lowering said frame by rocking it about a line drawn through the point of contact of said ground wheel with the ground and said rockable connection, said means including a crank axle and a furrow wheel on said crank axle opposite said ground wheel.

6. In a power lift plow, a frame, transport means at its forward end to which the frame is rockably connected, an axle on the rear end of said frame, a ground wheel revolubly mounted on said axle, and means for raising and lowering said frame by rocking it about a line drawn through the point of contact of said ground wheel with the ground and said rockable connection, said means including a crank axle and a furrow wheel on said crank axle opposite said ground wheel, said crank axle being actuated by power from said ground wheel.

7. In a power lift-plow, a front axle, furrow and land wheels on the axle, a frame member swiveled at the center of the axle and extending diagonally therefrom, tillage elements fixed to the frame member at one side thereof, a vertically adjustable furrow wheel connected to one side of the frame at the rear of the tillage elements, a rear land wheel carried on a fixed axle on the opposite side of the frame member, and traction actuated means for raising and lowering said rear furrow wheel to rock the frame on the front axle and rear land wheel.

8. The combination of an implement frame, a wheeled axle including a laterally rocking pivot supporting the forward end of the frame, a pair of wheels supporting the other end of the frame, one of which is on a fixed axle and the other on a vertically adjusting spindle, and a traction actuated device for raising and lowering the adjustable spindle.

9. The combination of an implement frame, a wheeled axle including a laterally rocking pivot supporting the forward end of the frame, a pair of wheels supporting the other end of the frame, one of which is on a fixed axle and mechanism for raising and lowering the other of said wheels by power from the wheel on the fixed axle.

10. The combination of an implement frame, a wheeled axle including a laterally rocking pivot supporting one end of the frame, a supporting wheel at the other end of the frame mounted on an axle rigid with the frame, a second supporting wheel on a spindle that is vertically movable with respect to the frame, and a traction actuated device for raising and lowering said spindle.

11. The combination of an implement frame, a laterally rockable support on one end of the frame, a rigid and a rotatable axle mounted on the other end of the frame on opposite sides thereof, with the axis of the rotatable axle at an upwardly directed angle to the other, a crank on the rotatable axle having a spindle substantially parallel to the axle, a supporting wheel on the spindle and rigid axle, and means for turning the rotatable axle to raise and lower its wheel.

12. The combination of an implement frame, a laterally rockable support on one end of the frame, a rigid and a rotatable axle mounted on the other end of the frame on opposite sides thereof and with the axis of the rotatable axle at an upwardly directed angle to the other, a crank on the rotatable axle having a spindle substantially parallel to the axle, a supporting wheel on the spindle and rigid axle, and means, actuated by power from one of the wheels, for turning the rotatable axle to raise and lower its wheel.

13. The combination of an implement frame, a laterally rockable support on one end of the frame, a rigid and a rotatable axle on the other end of the frame on opposite sides thereof and with the axis of the rotatable axle at an upwardly directed angle to the other, a crank on the rotatable axle, having a spindle substantially parallel to the axle, a supporting wheel on the spindle and rigid axle, power driven mechanism on the frame, an operating connection between said mechanism and the rotatable axle and means for controlling the actuation of said mechanism.

14. The combination of an implement frame, a laterally rocking support on the front end of the frame, a straight, rigid axle and a rotatable axle mounted on the rear end of the frame on opposite sides thereof with the rotatable axle at an upwardly directed angle to the other, a crank on the rotatable axle having a spindle substantially parallel with the axle, a supporting wheel on the cranked spindle and rigid axle, a clutch on the rigid axle, one member of which is connected to the wheel, a connection between the other member of the clutch and the rotatable axle including a rotatable element driven by the clutch, an operating crank on the rotatable axle, a lever pivoted intermediate its ends on the crank, a link between one end of the lever and the rotatable element, an adjustable connection between the other end of the lever and the frame and means for effecting connection and disconnection of the clutch.

15. In a plow, a frame comprising front and rear members and a diagonally extending beam connecting them, a plow secured at one side of said beam, a rockable support for the forward member, a fixed axle on the land side of the rear member carrying a land wheel, a vertically movable axle on the furrow side of the rear member carrying a furrow wheel, and means for raising and lowering said movable axle and furrow wheel to tilt the frame around an axis extending from the rockable support to the tread of said land wheel, whereby the plow can be raised clear of the ground and lowered into working position by adjustment of said furrow wheel alone.

16. In a power lift plow, a plow carrying frame, a land wheel and a furrow wheel supporting the frame, the land wheel being on a fixed axle and the furrow wheel on a cranked axle which has an inwardly extending portion journaled on the frame, and mechanism for swinging said crank axle by power from the land wheel comprising an intermittent clutch mounted on the land wheel axle and driven thereby and adapted to make one revolution at each actuation, and an operating connection between said clutch and the crank axle comprising a gear wheel driven by the clutch, a driving crank on the inner end of the journaled portion of the crank axle, a lever fulcrumed on said crank, a link connecting said gear wheel and lever, and an adjustable connection between one end of said lever and the frame.

17. In a power lift plow, a plow carrying frame, a land wheel and a furrow wheel supporting the frame, the furrow wheel having a vertically adjustable connection with the frame comprising a rotatable crank-axle and the land wheel being on a fixed axle, and mechanism for turning the crank axle by power from the land wheel comprising an intermittent clutch mounted on the land wheel axle and driven thereby and adapted to make one revolution at each actuation, and an operating connection between the clutch and a fixed arm on the crank axle of the furrow wheel, including a gear wheel driven by the clutch.

18. In a power lift plow, a plow carrying frame, a land wheel and a furrow wheel supporting the frame, the furrow wheel having a vertically adjustable connection with the frame comprising a rotatable crank-axle, and mechanism for turning the crank-axle by power from the land wheel comprising an intermittent clutch driven by the land wheel and adapted to make one revolution at each actuation, a revoluble element journaled on the frame and driven by the clutch so as to be given a half revolution at each actuation of the clutch, and an operating connection between said revoluble element and the crank-axle for the furrow wheel.

In testimony whereof I affix my signature.

ALEXUS C. LINDGREN.

Witnesses:
A. G. EKINS,
MYRTLE FLOCK.